(12) United States Patent
Boden

(10) Patent No.: US 6,371,217 B1
(45) Date of Patent: Apr. 16, 2002

(54) SWAY BUMPER FOR TRACTOR HITCH

(75) Inventor: Shane Michael Boden, Waterloo, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/481,895

(22) Filed: Jan. 12, 2000

(51) Int. Cl.$^7$ .............................................. A01B 59/043
(52) U.S. Cl. ....................................... 172/450; 172/439
(58) Field of Search ................................ 172/439, 450, 172/446, 440, 441; 280/460.1, 461.1

(56) References Cited

U.S. PATENT DOCUMENTS

| | | | |
|---|---|---|---|
| 3,047,076 A | * 7/1962 | Wier et al. ................... | 172/450 |
| 3,627,060 A | 12/1971 | Lemmon | |
| 3,709,304 A | 1/1973 | Haupt | |
| 3,721,302 A | * 3/1973 | Buchmuller et al. ........ | 172/450 |
| 3,791,456 A | * 2/1974 | Koch .......................... | 172/450 |
| 3,847,228 A | 11/1974 | Slosiarek et al. | |
| 3,888,316 A | 6/1975 | Azzarello et al. | |
| 3,910,355 A | 10/1975 | Massey-Ferguson | |
| 4,116,458 A | 9/1978 | Berg | |
| 4,216,975 A | 8/1980 | Schafer | |
| 4,268,057 A | 5/1981 | Engelmann et al. | |
| 4,397,359 A | 8/1983 | Price et al. | |
| 4,470,613 A | 9/1984 | Sykes | |
| 4,519,623 A | 5/1985 | Orthman | |
| 4,601,486 A | 7/1986 | Marcq | |
| 4,640,522 A | 2/1987 | Teich | |
| 4,711,460 A | 12/1987 | Schmittbetz | |
| 4,919,215 A | 4/1990 | Lee et al. | |
| 5,201,539 A | 4/1993 | Mayfield | |
| 5,823,268 A | * 10/1998 | Barnes ........................ | 172/450 |
| 6,044,915 A | * 4/2000 | Schlegel et al. ............ | 172/439 |

FOREIGN PATENT DOCUMENTS

| | | |
|---|---|---|
| EP | 0 315 594 | 5/1989 |
| GB | 906 815 | 9/1962 |

* cited by examiner

Primary Examiner—Thomas B. Will
Assistant Examiner—Kristine Markovich

(57) ABSTRACT

A wedge shaped bumper for the draft link of a tractor three point hitch is adjustable along the length of the draft link and has a concave curved surface in the longitudinal plane of the draft link. The longitudinal curve allows the bumper to be shorter in length than a flat surfaced wedge bumper while providing the same change in thickness. The bumper mounts to the draft link in a longitudinal channel formed by upper and lower walls on the draft link having tapered engagement surfaces to transmit vertically loading from the bumper to the draft link without shear loading of the bumper mounting bolt.

7 Claims, 4 Drawing Sheets

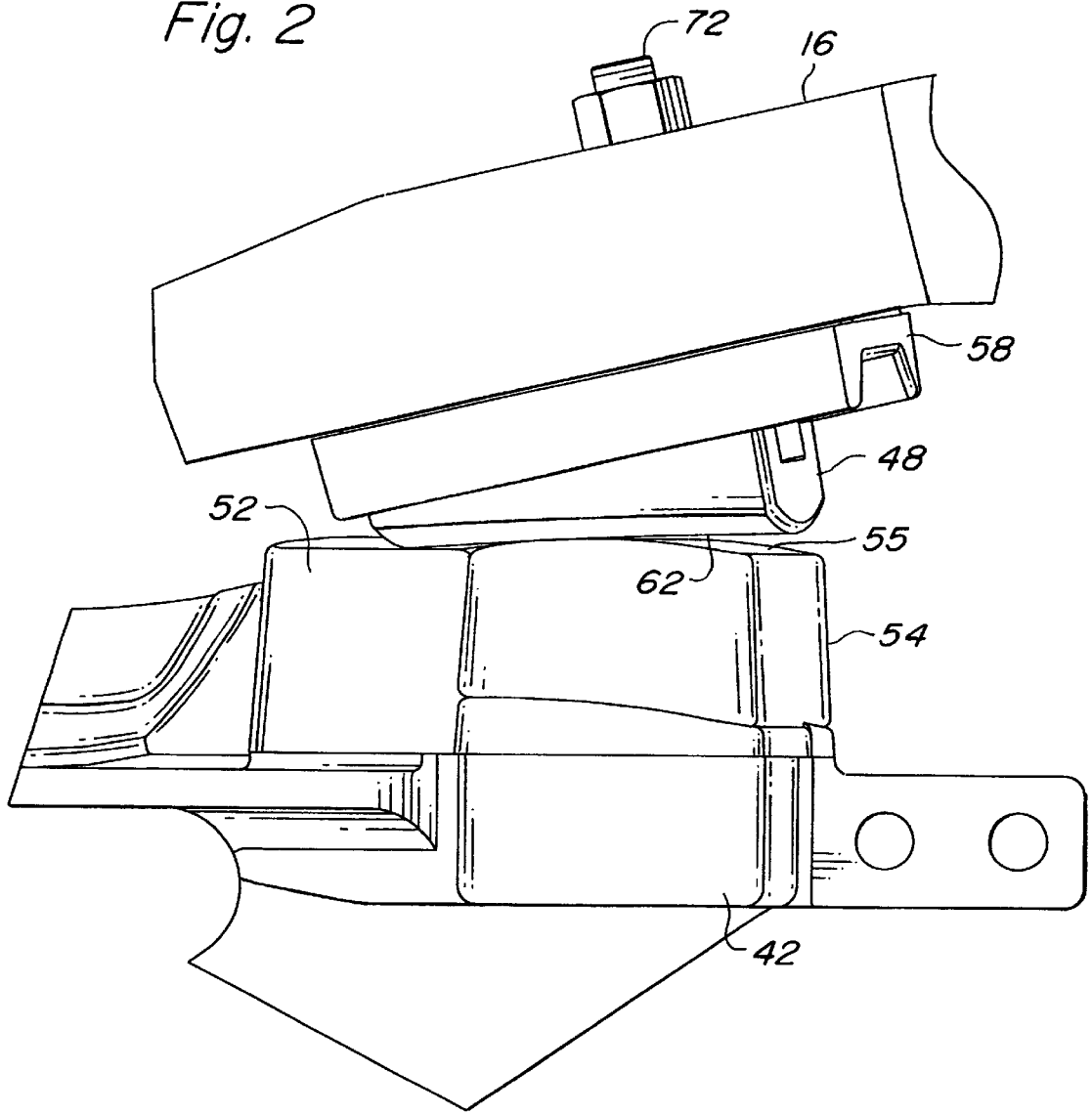

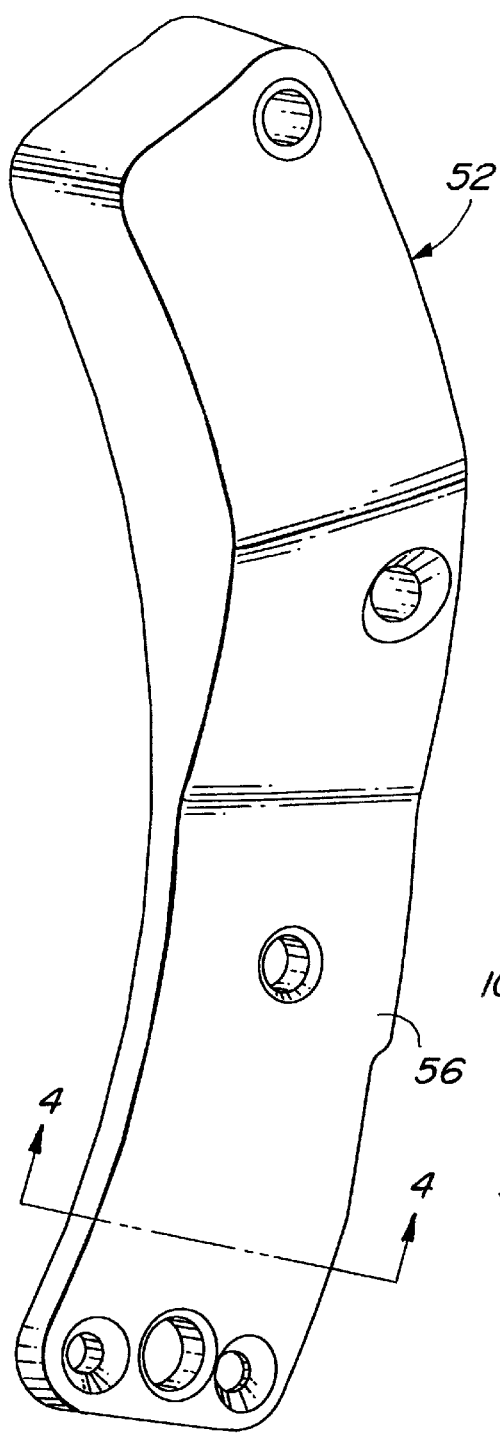
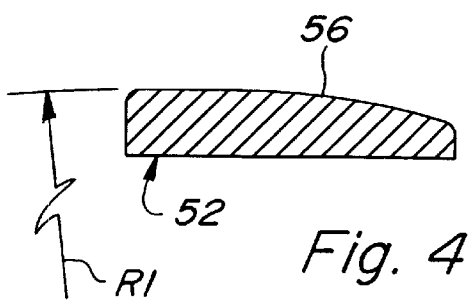
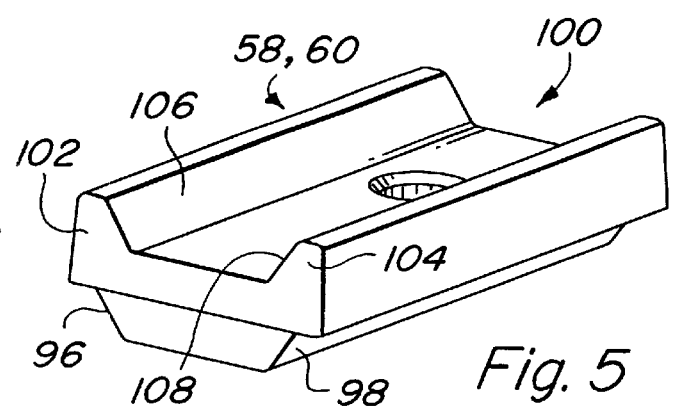
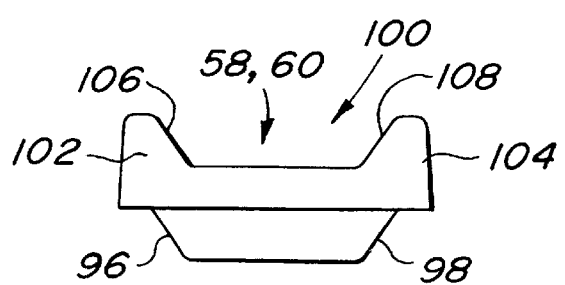

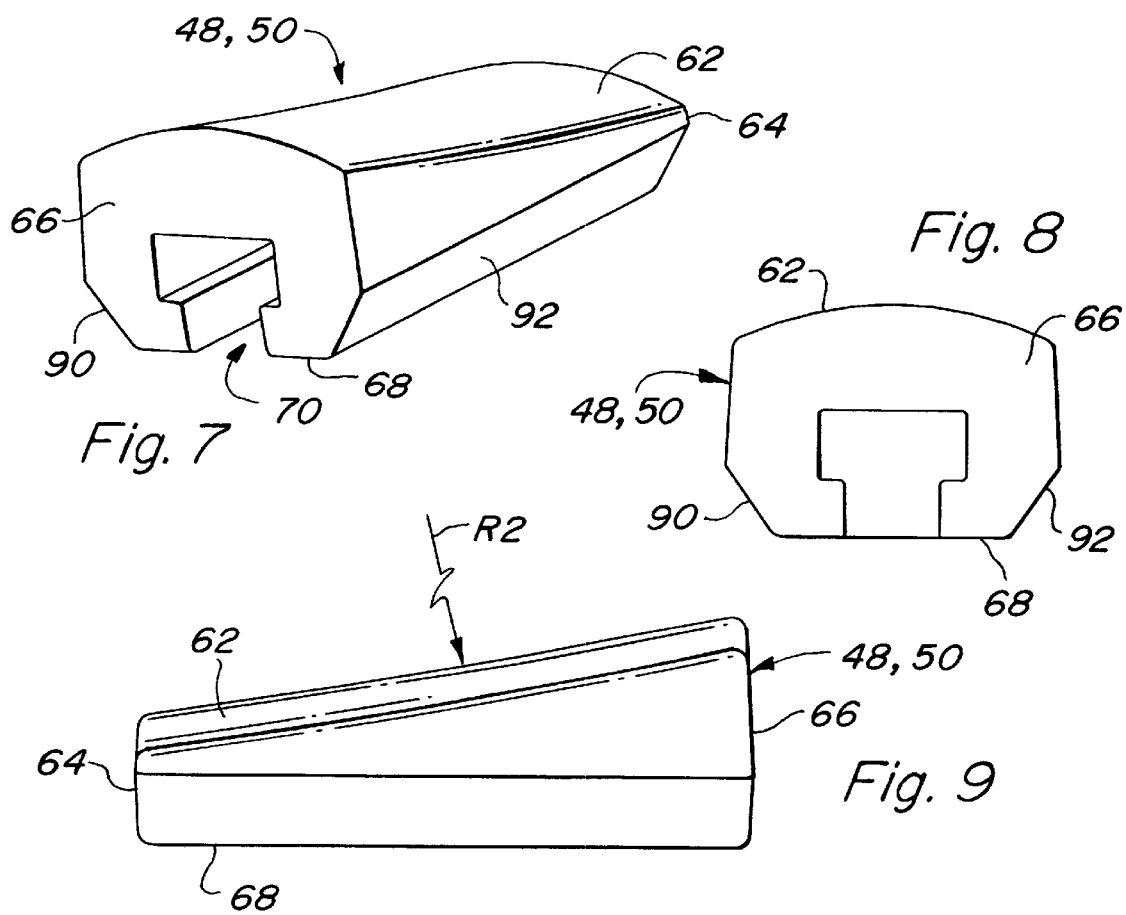
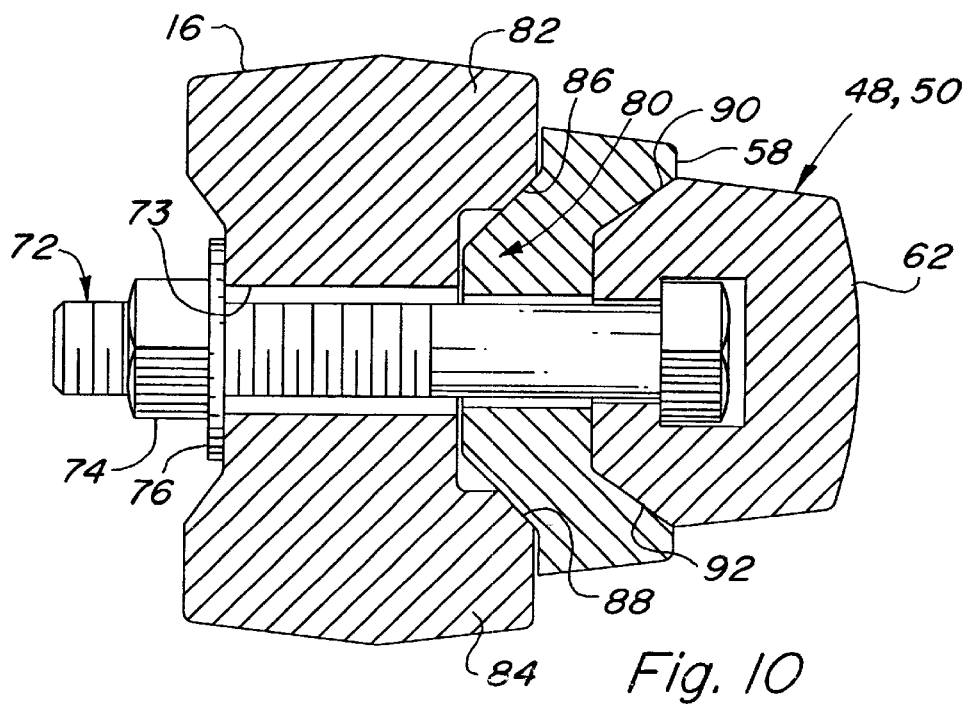

SWAY BUMPER FOR TRACTOR HITCH

BACKGROUND OF THE INVENTION

1. Field of the Invention

The present invention relates to a bumper on the draft links of a tractor three point hitch, and in particular to a wedge shaped bumper longitudinally adjustable along the draft link, the bumper having a contact surface with a curvature in the longitudinal direction of the draft link to compensate for different rotational positions of the draft link resulting from different positions of the bumper along the length of the draft link.

2. Description of the Related Art

A bumpers or pads for the draft links of three point hitches that are tapered lengthwise of the draft link are known, as shown in U.S. Pat. No. 4,470,613. There the pad is tapered lengthwise of the draft link and is adjustable in position lengthwise of the draft link to permit minor adjustment in the draft link end spacing and to compensate for wear in the co-action between the pad and the sway block mounted to the tractor frame. The pad surface is curved in a vertical plane but forms a flat surface in the lengthwise direction of the draft link. As the pad is moved lengthwise of the draft link, causing the draft link end spacing to change, the angular orientation of the draft link relative to the tractor longitudinal center changes, also changing the orientation of the bumper relative to the sway block and where the bumper contacts the sway block.

SUMMARY OF THE INVENTION

The present invention provides a bumper that is tapered, i.e. wedge shaped and movable lengthwise of the draft link. The tapered shape of the bumper enables the bumper, when it is moved longitudinally of the draft link, to change the end spacing of the draft links to adjust between the free link spacing for a hitch category and the appropriate quick coupler end spacing for the category. The bumper has a T-shaped slot extending lengthwise of the bumper from one end. The slot is open on the side of the bumper facing the draft link. The slot receives and retains the head of a mounting bolt that extends from the slot and through an aperture in the draft link to mount the bumper thereto. The slot enables the bumper to be longitudinally adjusted along the draft link.

The draft link has a longitudinally extending pocket with laterally projecting upper and lower walls. The upper and lower walls have diverging mounting faces for seating of the bumper thereon. The bumper, in turn, has complementary inclined mounting faces engaging the diverging mounting faces of the draft link walls. This provides greater vertical load carrying capability to the bumper than is available with flat, vertical, contact surfaces between the bumper and the draft link. With flat contact surfaces, the vertical loading on the bumper block is transmitted to the draft link by shear loading of the mounting bolt. This shear loading of the bolt is eliminated by the diverging mounting faces of the draft link and the complementary inclined faces of the bumper of the present invention.

To provide further adjustability and enable the draft link end spacing to be varied between wide and narrow hitch standards, or between two hitch categories, a spacer is available for placement between the draft link and the bumper. The spacer is of a uniform thickness along the entire length of the spacer and thereby does not add to or detract from the taper of the bumper. The spacer has one side with inclined mounting faces like the bumper and complementary to the diverging mounting faces of the draft link for engagement therewith. The opposite side of the spacer is formed with a longitudinally extending pocket, like the draft link, with upper and lower walls having diverging mounting faces for seating of the bumper thereon.

The bumper is formed with a longitudinally curved contact surface for engagement with the sway block carried by the PTO housing of the tractor. As the bumper is moved along the draft link, changing the draft link end spacing, the curvature of the bumper contact face compensates for the rotation of the draft link and maintains a constant angular relationship between the bumper contact face and the sway block as the bumper is adjusted longitudinally of the draft link and as the spacer is removed or added.

BRIEF DESCRIPTION OF THE DRAWINGS

FIG. 2 is a bottom view of the bumper and sway block of the hitch of the present invention.

FIG. 3 is a perspective view of the left side sway block of the hitch of the present invention.

FIG. 4 is a sectional view of the sway block as seen from the line 4—4 of FIG. 3.

FIG. 5 is a perspective view of a spacer used to mount the bumper to a draft link of the hitch of the present invention.

FIG. 6 is an end view of the spacer shown in FIG. 5.

FIGS. 7, 8 and 9 are a perspective, rear and side views respectively of the bumper of the hitch of the present invention.

FIG. 10 is a sectional view of a hitch draft link with the spacer and bumper mounted thereon as seen from the line 10—10 of FIG. 1.

DESCRIPTION OF THE PREFERRED EMBODIMENT

Figure 1:
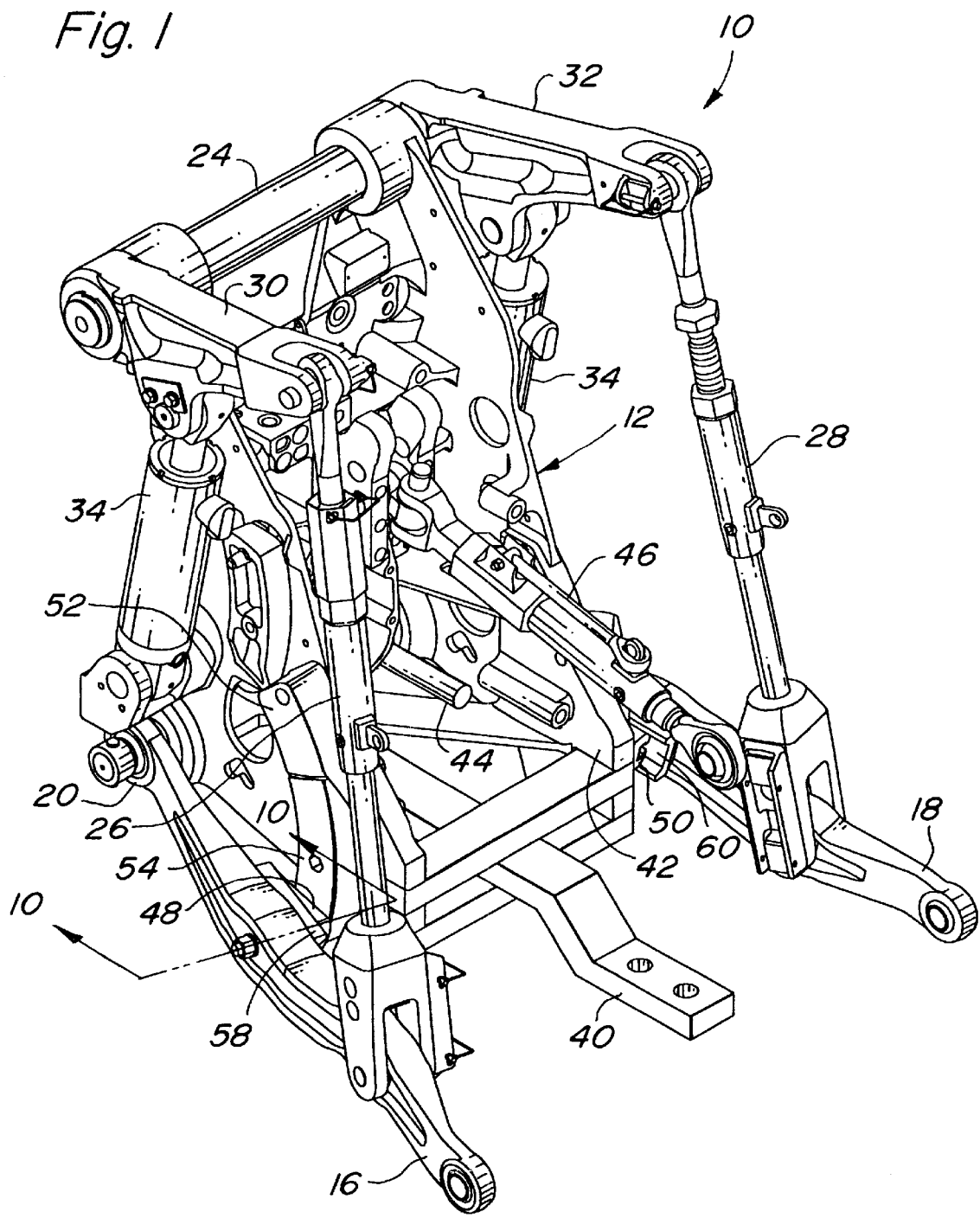
FIG. 1 is a perspective view of the tractor hitch of the present invention.

A tractor hitch is shown in FIG. 1 and designated generally at 10. The hitch 10 includes a housing 12 that is coupled to and integral with a tractor frame, not shown. The hitch includes left and right draft links 16,18 that are universally attached to the housing 12 at their front ends 20 by spherical bearings in a known manner. The draft links are coupled to a rock shaft 24 via left and right lift links 26, 28 and left and right lift arms 30, 32. Lift cylinders 34 between the lift arms 30, 32 and the housing 12 raise and lower the lift arms and thereby raise and lower the draft links 16, 18. An upper link 46 is universally coupled to the housing 12 and together with the draft links 16,18 completes the three point hitch.

A drawbar 40 extends rearward from the housing 12 beneath a PTO housing 42. The PTO housing 42 generally surrounds the PTO shaft 44. Left and right bumpers 48, 50 are mounted to the inboard sides of the draft links 16,18 to engage left and right sway blocks 52, only the left sway block is shown, to control the lateral sway of the draft lengths. The sway block 52 is wider at its upper end to prevent sway in a raised transport position of the draft links. A lockout 54 is shown attached to the lower portion of the sway block 52 to prevent sway in the lowered position of the draft links. The lockout 54 is removable to enable sway of an implement when the draft links are lowered to use positions adjacent the lower portion of the sway blocks. In FIG. 1 the bumpers 48, 50 are shown mounted on left and right spacers 58, 60 described in detail below.

The bumpers 48, 50 have a contact surface 62 that has a convex curvature in a vertical plane as shown in FIG. 8. The contact surface 62 also has a concave curvature in a longitudinal plane of the draft link as shown in FIG. 9 with the radius designated $R_2$. The bumper is tapered, or wedge shaped, having a forward end 64 that has a lateral thickness less than the lateral thickness at the rear end 66. The radius $R_2$ results in the contact surface 62 having an angle of 8° relative to the base surface 68 of the bumper measured at the forward end 64 and an angle of 12° relative to the base surface 68 at the rear end. The longitudinal curvature of the contact surface of the bumper enables the bumpers to be shorter in length compared to a flat surfaced wedge bumper while still achieving the same change in wedge thickness between the ends of the bumper.

With reference to FIGS. 3 and 4, the sway blocks 52 each have a curved body when viewed from the side and with a center of curvature approximately at the pivot center of the draft links at their forward ends. The sway blocks have a laterally outwardly facing contact surface 56 that has a convex curvature of a radius $R_1$. The radius $R_1$ is measured on a radial plane of the curved sway block. The sway block is tapered in thickness such that the rear of the sway block is thinner than the front of the sway block as shown in FIG. 4. The lock out 54 has a similar shaped contact surface 55 as shown in FIG. 2. When the bumper 48, 50 is moved rearward such that the front portion of the bumper contacts the sway block 52 or lockout 54, the bumper contacts the front portion of the sway block or lock out. When the bumper is moved forward, the bumper will contact the sway block or lockout at a further rearward location. The curved contact surface of the sway block with the radius $R_1$ producing the rearward taper of the sway block and the larger radius $R_2$ of the bumper provides the desired sway and draft link spacing while minimizing the length of the bumper 48, 50.

The bumper further includes a T-shaped slot 70 that extends longitudinally into the bumper from the rear end 66. The slot 70 is open on the base or draft link side 68 of the bumper. The slot 70 receives the head of a mounting bolt 72, see FIG. 10. The bolt shank extends through an aperture 73 in the draft link and is retained by a nut 74 and washer 76.

The draft links are formed each with a longitudinally extending pocket 80 formed by upper and lower laterally projecting walls 82, 84. The projecting walls form diverging mounting faces 86, 88 respectively. The bumper, on the base side 68, is formed with inclined mounting faces 90, 92 that are complementary to the diverging mounting faces of the draft link for mounting of the bumper thereon. The diverging and inclined faces of the draft link and bumper assist in the transmission of vertical loads on the bumper to the draft link without excessive shear loading of the mounting bolt 72.

The spacer 58, 60, FIGS. 5 and 6, has one side with inclined contact faces 96, 98 like the bumper inclined contact faces 90, 92. The spacer faces 96, 98 engage the diverging mounting faces 86, 88 of the draft link. The opposite side of the spacer has a channel 100 with upper and lower walls 102, 104 forming diverging mounting faces 106, 108, like the upper and lower walls of the draft link for engagement with the bumper inclined contact faces 90, 92. Use of the spacers 58, 60 forces the rear ends of the draft links farther apart for a wide versus narrow draft link spacing. Alternatively, the spacers could be used to change the draft link spacing from one hitch category to another.

The T-slot 70 in the bumper enables the bumper to be moved longitudinally of the draft link to adjust the rear end spacing of the draft links. The wedge shape of the bumper can be configured to provide the needed difference in draft link spacing between free link and quick coupler configurations within a given hitch category. In addition, slight adjustment of the bumper position can accommodate for wear of the bumpers and sway blocks.

I claim:

1. A tractor hitch comprising a pair of draft links mounted on opposite lateral sides of a tractor frame and extending rearwardly therefrom, a bumper on each of the draft links and a sway block on each lateral side of the tractor frame for engagement by the bumpers to limit sway of the draft links, each sway block having a laterally outward contact surface for engagement with the associated bumper, the sway block contact surface having a curvature of a first radius in a plane parallel to a longitudinal axis of the draft link and the bumpers being tapered lengthwise of the draft link and being adjustable in position lengthwise of the draft link, the bumpers having a contact surface with a curvature of a second radius in a plane parallel to a longitudinal axis of the draft link.

2. The tractor hitch as defined by claim 1 wherein the second radius is larger than the first radius.

3. The tractor hitch as defined by claim 1 wherein the bumper contact surface is concave and the sway block contact surface is convex.

4. The tractor hitch as defined by claim 1 wherein the draft link has a longitudinally extending pocket with upper and lower walls having diverging mounting faces for seating of the bumper thereon and the bumper having complementary inclined mounting faces engaging the diverging mounting faces of the draft link.

5. The tractor hitch as defined by claim 4 further comprising a spacer disposed between the bumper and the draft link to position the contact surface of the bumper further from the draft link, the spacer having complementary inclined mounting faces on one side engaging the diverging mounting faces of the draft link and a longitudinally extending pocket on an opposite side with upper and lower walls having diverging mounting faces for seating of the bumper thereon.

6. The tractor hitch as defined by claim 1 further comprising a spacer disposed between the bumper and the draft link to position the contact surface of the bumper further inboard from the draft link.

7. The tractor hitch as defined by claim 1 wherein the bumper is formed with a slot projecting into the bumper from one longitudinal end and open on the side of the bumper facing the draft link, the slot having a T-shaped cross section to receive and retain a head of a mounting bolt that extends from the slot and through an aperture in the draft link to mount the bumper thereto and to longitudinally adjust the position of the bumper on the draft link.

* * * * *